United States Patent [19]
Goetz et al.

[11] Patent Number: 6,115,610
[45] Date of Patent: Sep. 5, 2000

[54] MOBILE RADIO SYSTEMS

[75] Inventors: Ian Goetz, Oxfordshire; Stephen M Gannon, Buckinghamshire; Peter R Munday, Berkshire, all of United Kingdom

[73] Assignee: British Telecommunications public limited company, London, United Kingdom

[21] Appl. No.: 09/043,890
[22] PCT Filed: Dec. 11, 1996
[86] PCT No.: PCT/GB96/03056
 § 371 Date: Mar. 31, 1998
 § 102(e) Date: Mar. 31, 1998
[87] PCT Pub. No.: WO97/24008
 PCT Pub. Date: Jul. 3, 1997

[30] Foreign Application Priority Data

Dec. 22, 1995 [EP] European Pat. Off. .............. 95309429

[51] Int. Cl.[7] ...................................................... H04Q 7/30
[52] U.S. Cl. ........................................... 455/450; 455/449
[58] Field of Search .................................... 455/450, 449, 455/13.2, 13.1, 11.1, 451, 452, 453, 454, 500, 507, 509, 520; 375/211

[56] References Cited

U.S. PATENT DOCUMENTS

| | | | |
|---|---|---|---|
| 4,670,899 | 6/1987 | Brody et al. | 455/453 |
| 5,442,681 | 8/1995 | Kotzin et al. | 455/450 |
| 5,493,695 | 2/1996 | Aitkenhead et al. | 455/450 |
| 5,535,426 | 7/1996 | Leigh et al. | 455/450 |
| 5,568,511 | 10/1996 | Lampe | 375/211 |

FOREIGN PATENT DOCUMENTS

| | | |
|---|---|---|
| 93 13632 | 7/1993 | WIPO . |
| 94/00959 | 1/1994 | WIPO . |
| 94 28644 | 12/1994 | WIPO . |
| 95 23463 | 8/1995 | WIPO . |

OTHER PUBLICATIONS

Chrapkowski et al., Mobile Trunked Radio System Design and Simulation, 1991 IEEE.
Naor et al. , Scheduled Hot–Potato Routing, 1995 IEEE.
Ekstrom., Site Hand Off Operation in a SmartZone System, 1994 IEEE.
Ferguson., Tutorial: The Synchronous Digital Hierarchy, 1992 IEEE.
Electrical Communication, Jan. 1, 1993, Paris, FR, pp. 155–163, Varin, "GSM Base Station System".

*Primary Examiner*—Dwayne D. Bost
*Assistant Examiner*—Joy K. Redmon
*Attorney, Agent, or Firm*—Nixon & Vanderhye P.C.

[57] ABSTRACT

A cellular radio system includes radio base stations, each having an allocated number of radio channels. Each radio base station is connected to the rest of the network by a branched network. At a branch point an intermediate switch is provided for connecting channels in the trunk portion to channels in the branches. The capacity of the trunk link is less than the total capacity of the base stations (and of their associated branch links). At times when one or more of the base stations have surplus capacity, that capacity is disabled so that the capacity of the trunk link is not exceeded. The capacity of each base station may be varied according to predicted or actual demand, provided that the total (non-disabled) capacity of the base stations does not exceed that of the trunk link.

19 Claims, 6 Drawing Sheets

Figure 6

MOBILE RADIO SYSTEMS

BACKGROUND OF THE INVENTION

1. Field of the Invention

This invention relates to mobile radio systems. The invention will be described primarily in relation to cellular radio networks. However the invention is also applicable to other mobile radio systems, such as private mobile radio (PMR) systems.

2. Related Art

In a typical cellular radio network a number of radio base stations are located throughout the area in which radio coverage is required, in order to allow mobile units throughout that area to be in radio communication with the fixed part of the network via one of the radio base stations. The radio base stations comprise radio transceivers for establishing radio communication with nearby mobile units. Several radio channels are provided to allow simultaneous communication with several mobile units. These radio channels may for example be separate time slots in a time-division scheme, and/or different radio frequencies. The radio base stations are themselves physically connected by fixed links to a switching centre, and thereby a communications link can be activated between two mobile units via respective radio base stations, or between a mobile unit (again via a radio base station) and a fixed telephone network e.g. PSTN, or other cellular radio system, or other telecommunications network.

The radio base stations require control functions to establish radio communication with mobile units, and to carry out various other functions to determine which mobile units are within its area of coverage in order to direct incoming calls to the correct mobile unit, and to arrange handover of calls should a mobile unit move during the course of a call from the area served by one base station to that served by another. Such control functions include commands to the radio base stations to communicate with a mobile unit on one of its allocated channels, including instructions as to when to start and terminate the call, or to carry out handover processes.

In the GSM (Global System for Mobile radio) standard, these control functions of the radio base stations are functionally, and usually physically, separate from the transceivers they control. The control functions are performed by a "Base Site Controller" (BSC) controlling the radio transceivers of several radio base stations, (known in the GSM system as "Base Transceiver Sites" (BTS)), which may be some distance away. Because of the complexity involved, it is advantageous to concentrate the necessary equipment to perform the control functions in a small number of locations in this way, to provide ease of access for maintenance. The terminology used in the GSM standard is used herein for convenience, but is not limitative on the scope of the claims. In particular, it should be noted that the term "radio base station" embraces a base transceiver site unless the context clearly demands otherwise.

The connections between the base transceiver sites and the base site controller can be quite long, typically several tens of kilometers. The connections between the base transceiver sites and the base site controllers can make up a substantial part of the infrastructure of the cellular radio network. In many cases the fixed links from several base transceiver sites meet at some point, hereinafter referred to as a "branch point", intermediate between the base transceiver site and the base site controller or other switch, and continue from the branch point over a common trunk link, for the rest of the route to the base site controller or other switch.

Each base transceiver site has a number of radio channels available to it. The number of channels determines the maximum number of mobile units which can communicate with a base transceiver site simultaneously. In order that this maximum capacity can be achieved, the fixed physical link between the base transceiver site and the base site controller requires at least the same number of individual communication channels to be available to it. The term "channel", as used herein, refers to the resources (time slot, cable, carrier frequency etc) used to carry an individual call over the communications link or links in question. A "radio channel" is such a channel in a radio link, and similarly for a "trunk channel" etc.

For that part of the routing between the various base transceiver sites and the base site controller which is shared over a common trunk link, the number of channels required in the fixed link is equal to the total capacity of all the base transceiver sites. This is wasteful of the capacity of the link over the common trunk, because it is most unlikely that all the base transceiver sites will be operating at full capacity at the same time.

Even in systems in which the control functions and radio transceivers are physically co-located in a radio base station, (that is to say, the base site controller functions are carried out at the base transceiver site) a similar problem arises in the fixed links between the base stations and the main mobile switching centre (MSC), which serves many radio base stations. The fixed links also form a branched network and there can be over provision of capacity in the trunk common to several branches for the same reasons.

International patent specification WO94/00959 (Nokia) describes an arrangement in which a synchronous digital hierarchy (SDH) network comprising a loop serves a number of individual microcell base transceiver sites. At each base transceiver site on the loop there is an Add-drop multiplexer (ADM) which allows the channels relevant to the base transceiver site or sites served by the multiplexer to be extracted. Since the SDH loop is common to all the base transceiver sites, and any of its channels may be allocated to any of the base transceiver sites according to demand, fewer channels are required in the SDH system than the total combined capacity of the base stations.

However, this system suffers from a number of disadvantages. Firstly, the basic element of an SDH carrier, known as STM-1, has a capacity of 155 Mbit/s. A typical microcell site requires only 320 kbit/s. Consequently, to use the SDH network to capacity, more than 500 microcell sites would have to be served by each loop if the total combined capacity of the base stations is to be greater than the capacity of the SDH system. This is an inefficient use of the capacity of the SDH system, as each microcell on the loop has to be fed by two 155 Mbit/s connections, in order to supply a 320 kbit/s capacity. Moreover, five hundred microcell sites would serve a large area, and to have a large area served by a single loop would leave it very vulnerable to any faults—two faulty links could isolate all five hundred microcells. Also, the physical size of an add-drop multiplexer is very much greater than that of the microcell base site electronics itself, so such a microcell/ADM combination would be less convenient to install, and have greater visual impact. Moreover, the arrangement described in the above-mentioned patent specification has a single base site controller (BSC) and mobile switching centre serving all the base transceiver sites. This requires control signals to be transmitted over the SDH loop between the BSC and each BTS. A channel for such control signals, to control handover etc, must be available to each base transceiver site, even when not in use, so that a handover can be initiated. Each channel of each base site transceiver has its own signalling channel, and these would all have to be forwarded over the SDH loop to the BSC.

SUMMARY OF THE INVENTION

According to a first aspect of the present invention there is provided a mobile radio system for serving a plurality of mobile radio stations, the system comprising: a plurality of radio base stations for communicating with the mobile radio stations, and each having an allocated number of radio channels;

one or more trunk communications links;

each trunk communications link serving a respective intermediate switch serving a plurality of radio base stations;

each radio base station being connected to its serving intermediate switch by a communications link having at least the same number of channels as the radio base station has allocated radio channels;

each trunk communications link having fewer channels than the total number of radio channels of the plurality of radio base stations served by its respective intermediate switch; and radio resource control means for controlling the radio base stations so that the total number of channels in use by each trunk communications link is greater than or equal to the number of radio channels in use by the base stations it serves.

According to a second aspect of the invention, there is provided a method of operating a mobile radio system comprising a plurality of radio base stations each capable of transmitting to, and receiving radio signals from, mobile radio stations on a number of radio channels, each radio base station being connected to an associated intermediate switch by an associated communications link having at least the same number of channels as the radio base station has allocated radio channels; and one or more trunk communications links, each trunk communications link serving a respective intermediate switch and having fewer channels than the total number of radio channels of the plurality of base stations served by its respective intermediate switch, the method comprising the steps of controlling one or more of the radio base stations connected to an intermediate switch, and their associated communications links, so that the total number of radio channels in use by the radio base stations served by an intermediate switch is less than or equal to the number of channels used by the trunk communications link serving the intermediate switch.

This arrangement allows a trunk link, having a lower capacity than the combined capacities of the radio base stations it serves, to be used between an intermediate switch, located at the point where the routes to the individual base stations branch, and the rest of the network. The branched layout is more efficient than a loop, both in terms of total length of the individual links, and because the capacity requirements are lower on the more remote branches. Furthermore, the branched layout is suitable for use by a plesiochronous digital hierarchy (PDH), as an alternative to the SDH, as will be described.

In the preferred embodiment, the trunk communications link connects the intermediate switch to a base site controller where the main base station control functions still take place. In one arrangement, one or more first intermediate switches are connected by their respective trunk communications link to a further one of the intermediate switches, the further intermediate switch thereby serving the base stations also served by the one or more first intermediate switches. The further intermediate switches may themselves also serve one or more further base stations directly.

In an enhancement of the invention, the introduction of a limited switching capability at a branch point also allows the channels to be routed selectively over common physical trunk links between the branch point and the rest of the network, thereby providing some safeguard against total loss of the links. The radio base stations are not dedicated to individual channels over the trunk link between the intermediate switch and the rest of the network, so in the event of the loss of one of the physical trunk links, each radio base station can have some of its channels routed over the remaining physical link or links, thereby allowing all radio base stations to continue operating, albeit probably with lower capacity.

Preferably, each radio base station has associated control means to selectively enable and disable one or more of its available radio channels (and associated channels in the communications link) such that the total number of enabled radio channels does not exceed the number of channels in the trunk link, and the intermediate switch has means to allocate the channels in the trunk link to calls using those channels in the communications link associated with the currently enabled radio channels.

The allocation of channels in the trunk link to the radio base stations can be done according to demand. In one embodiment the allocation is pre-programmed according to a predetermined schedule, based on predicted demand at different base stations at different times of day. If a radio channel of a radio base station is in use by a call in progress at the time when the channel is due to be disabled, it may be arranged that the disabling of the channel, and the corresponding enabling of a radio channel in another radio base station, is delayed until the call finishes or is handed over, and the channel becomes free.

In an alternative arrangement the channels may be allocated on the basis of actual demand, so that a channel in the trunk link is only allocated to a radio base station when communication with a mobile unit within the coverage area of the radio base station is required. In the case of handover of a mobile unit from one radio base station to another served by the same intermediate switch, it may be arranged that the connection in the intermediate switch of the trunk channel allocated to the call is transferred from the first radio base station to the second radio base station at the time of handover, thereby allowing the call to continue even though the trunk link is operating at full capacity.

The selection of radio base stations which share trunk channels in the trunk link can be made according to predicted demand patterns. For example, a base station which is used to maximum capacity during the travel-to-work period, but is quiet during working hours, such as one serving a major railway station, may share with a base station in which the converse is true, such as one serving a city centre. The base stations need not be physically close to each other; the only geographical requirement is that they are served by the same intermediate switch, i.e. the same branch point.

The trunk communications links may be controlled by a transmission network management means, and the system may further comprise a traffic-demand data-input means, and a transmission capacity controller for co-ordinating the operation of the radio resource control means and transmission network management means in response to inputs from the traffic-demand data input means. The data used may be historic, but is preferably monitored in real-time. The system may be arranged such that any spare traffic capacity is distributed in the radio and transmission networks.

BRIEF DESCRIPTION OF THE DRAWINGS

Preferred embodiments of the invention will be further described with reference to the accompanying drawings in which:

FIG. 6 shows a timeslot allocation pattern in use on one of the communications channels of a trunk link of the simplified system illustrated in FIG. 3.

DETAILED DESCRIPTION OF THE EXEMPLARY EMBODIMENTS

In order to understand the invention, it is useful to first consider the traffic demand in an illustrative system. The problem has been greatly simplified for the purposes of this illustration, but the underlying principles would apply in a more complex system having many base stations and more variable loadings.

Figure 1:
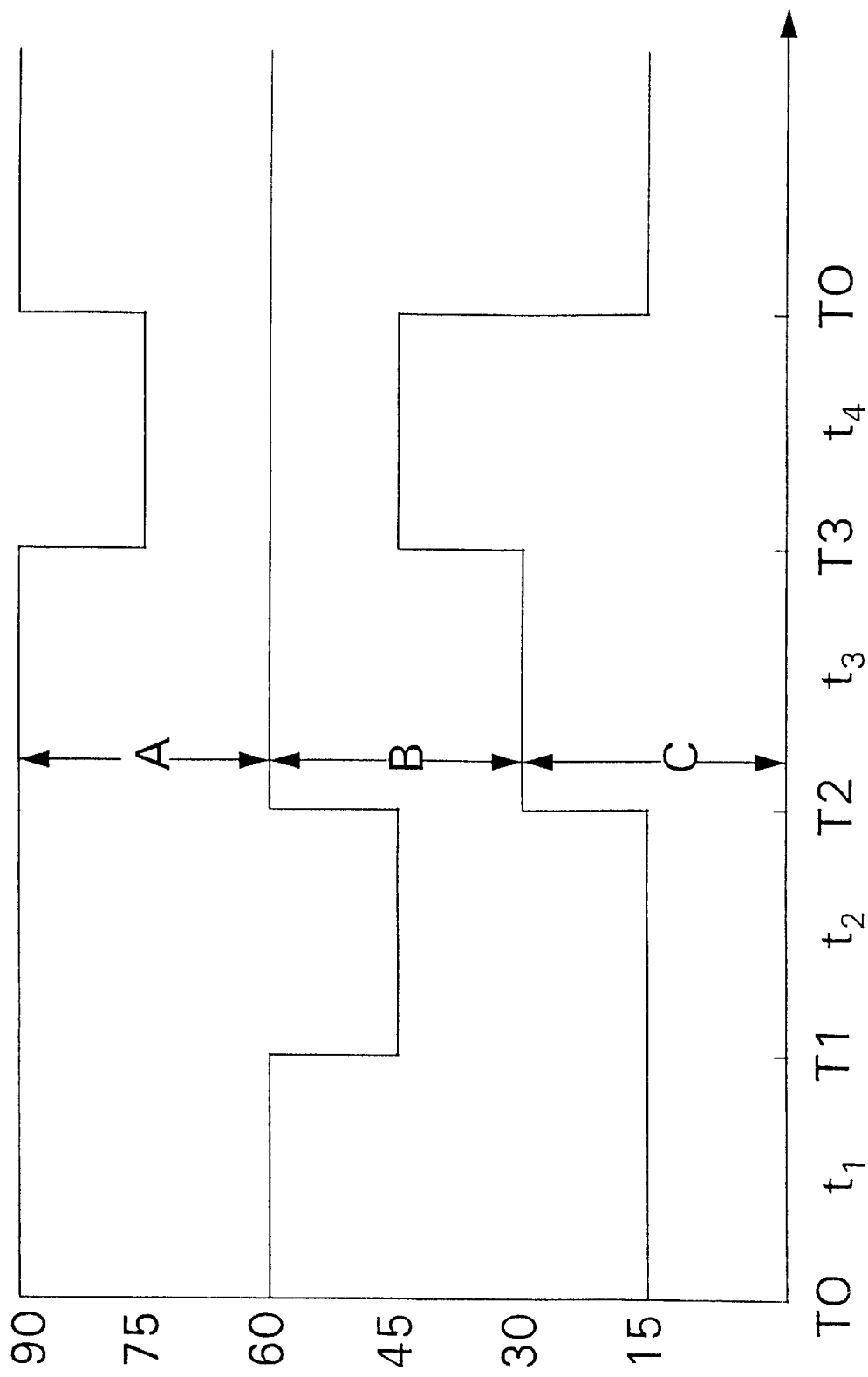
FIG. 1 shows a typical pattern of traffic demand in three radio base stations.

FIG. 1 shows illustrative traffic levels for three radio base stations of an illustrative cellular radio system. Each radio base station (BTS) A, B, C has a maximum capacity of 45 communications channels, but these radio base stations do not all require that maximum capacity at the same time. In a morning period t1 (from T0 to T1, 7 a.m. to noon) the radio base station B requires its full capacity of 45 channels, whilst radio base stations A and C require 30 and 15 channels respectively. In an afternoon period t2 (from T1 to T2: noon to 6 p.m.) the radio base station A requires its full capacity of 45 channels, whilst radio base stations B and C require 30 and 15 channels respectively. In an evening period t3 (from T2 to T3: 6 p.m. to midnight) all three radio base stations A, B, C require 30 channels. In a night period (T3 to T4: midnight to 7 a.m.) the radio base station C requires its full capacity of 45 channels, whilst radio base stations A and B each require only 15 channels.

Figure 2:
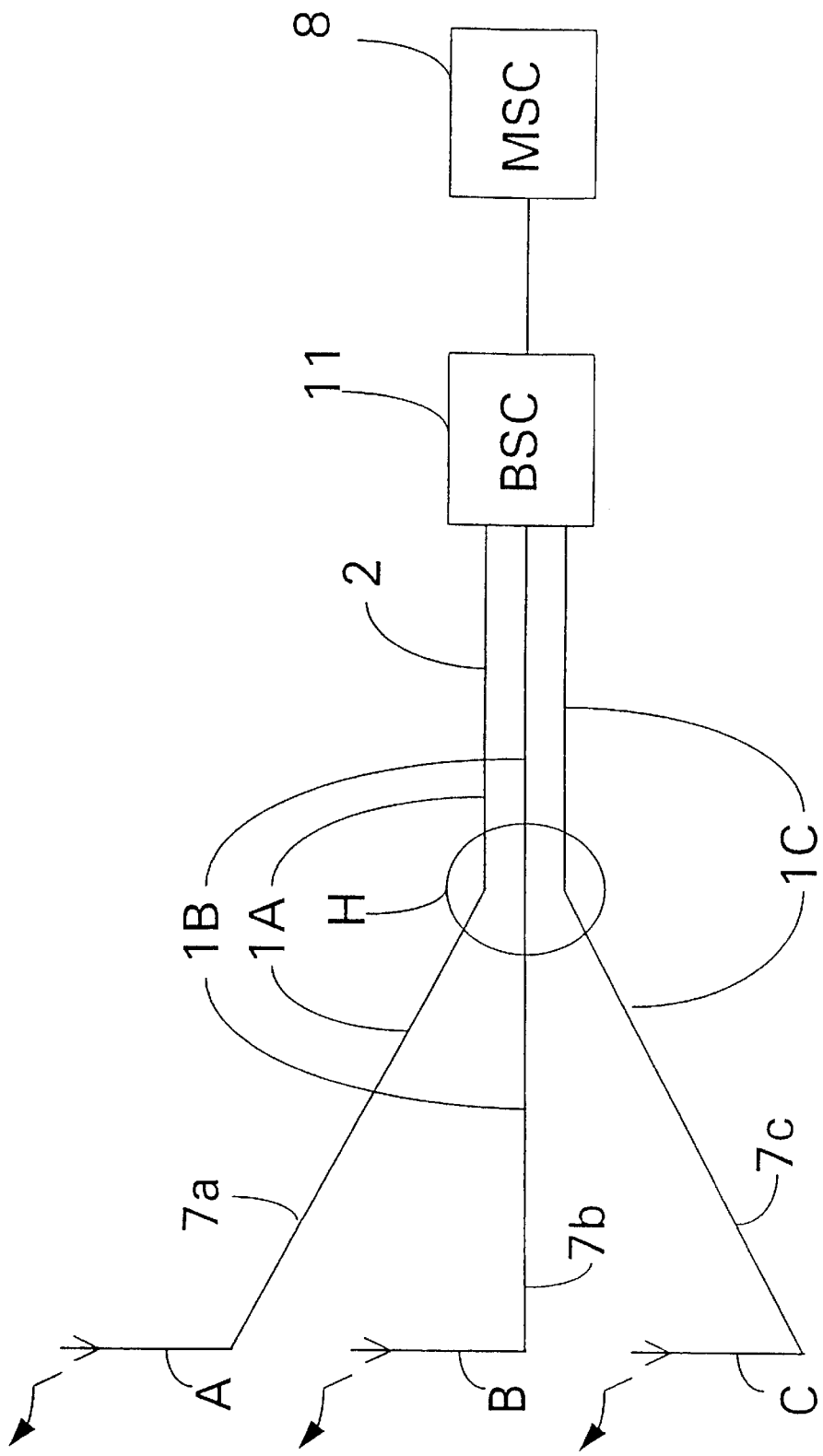
FIG. 2 shows a prior art cellular radio system.

FIG. 2 shows a basic layout in which the three radio base stations (base transceiver sites BTS) A, B and C are connected to a switching centre MSC through a base site controller (BSC) 11, by means of respective links 1A, 1B, 1C, forming a branched network. Each link 1A, 1B, 1C has a respective branch portion 7a, 7b, 7c from the base transceiver site to a branch point H, and a common trunk portion 2 from the branch point H to the base site controller BSC (11). In this prior art system the branch point H is simply a physical connection between the branch portion and trunk portion of each physical link 1A, 1B, 1C.

Figure 3:
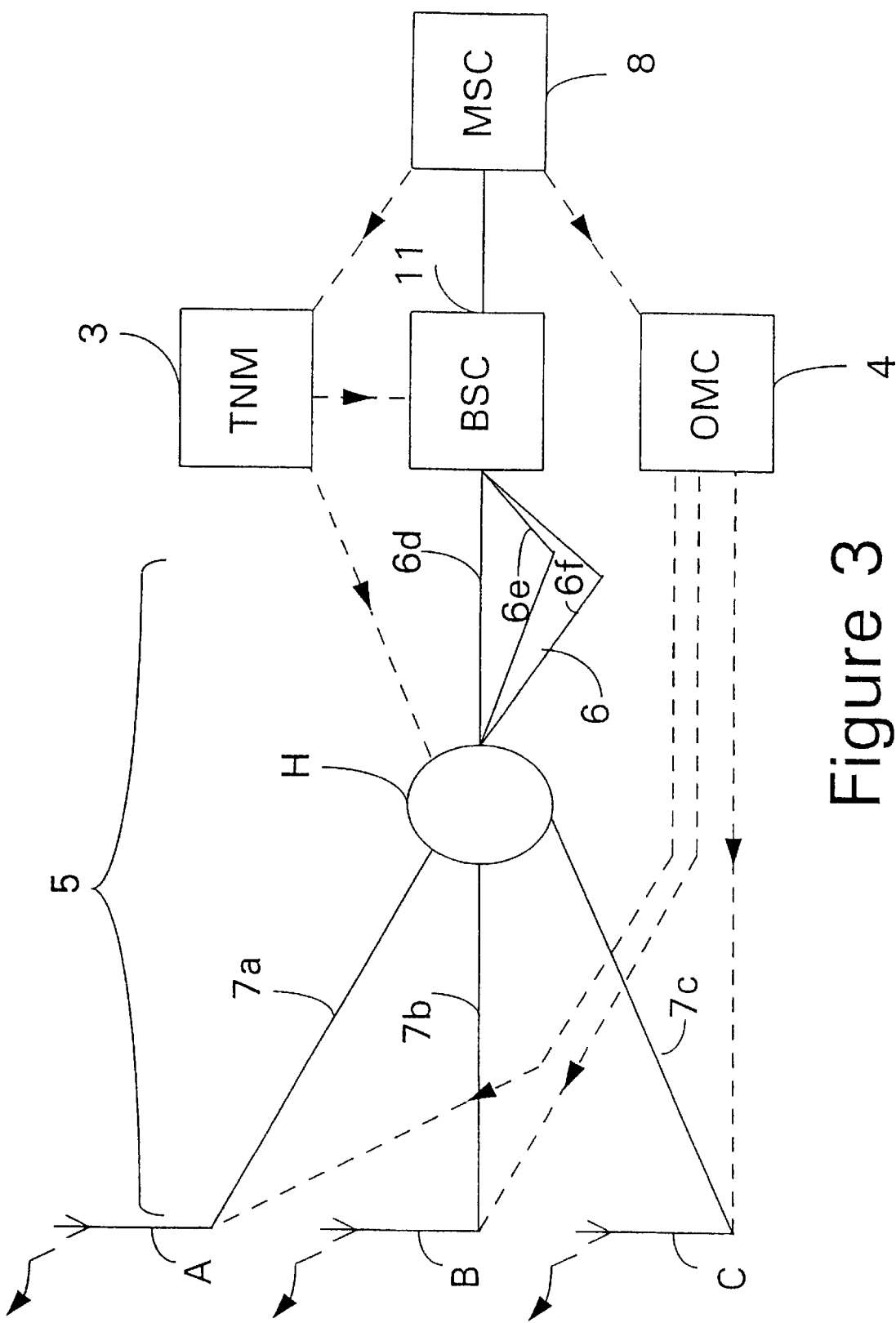
FIG. 3 illustrates a simplified cellular radio system according to the preferred embodiment of the invention.

In the system shown in FIG. 3 a cellular radio system according to the preferred embodiment of the invention is illustrated. The GSM system architecture and terminology are used herein for illustrative purposes. In this system there are again three base transceiver sites A, B and C connected to a branch point H through respective links 7a, 7b, 7c, and from the branch point H by way of a trunk link 6 to a mobile switching centre (MSC) 8 via a base site controller BSC (11). The trunk link 6 has three channels 6d, 6e, 6f. However, these channels are not each permanently dedicated to a respective one of the links 7a, 7b, 7c. Instead, in the arrangement of FIG. 3, the branch point H includes a switch having a functionality which will be described below. This functionality is controlled by a transmission network manager 3 of an intelligent network control system, which also controls cross connects in the base site controller BSC 11. The network control system also includes an operation and maintenance centre (OMC) 4 for controlling the radio resource, essentially the base transceiver sites A, B and C working to the base site controller BSC (11). The branch point H is connected to the base site controller by the trunk link 6. The transmission network manager 3 and OMC 4 are under the overall control of the mobile switching centre (MSC) 8. The necessary control signals, represented by dotted lines in FIG. 3, are transmitted from the OMC 4 to the base stations A, B, C and from the transmission network manager 3 to the base site controller 11 and hub H over the physical links 7a, 7b, 7c and 6. It will be appreciated that various architectures are possible for the transmission network. The trunk link 5, including channels 6d, 6e, 6f, may be part of a complex transmission networks whose physical architecture includes multiple redundancy, alternative routings, etc, all under the control of the transmission manager 3.

Figure 4:
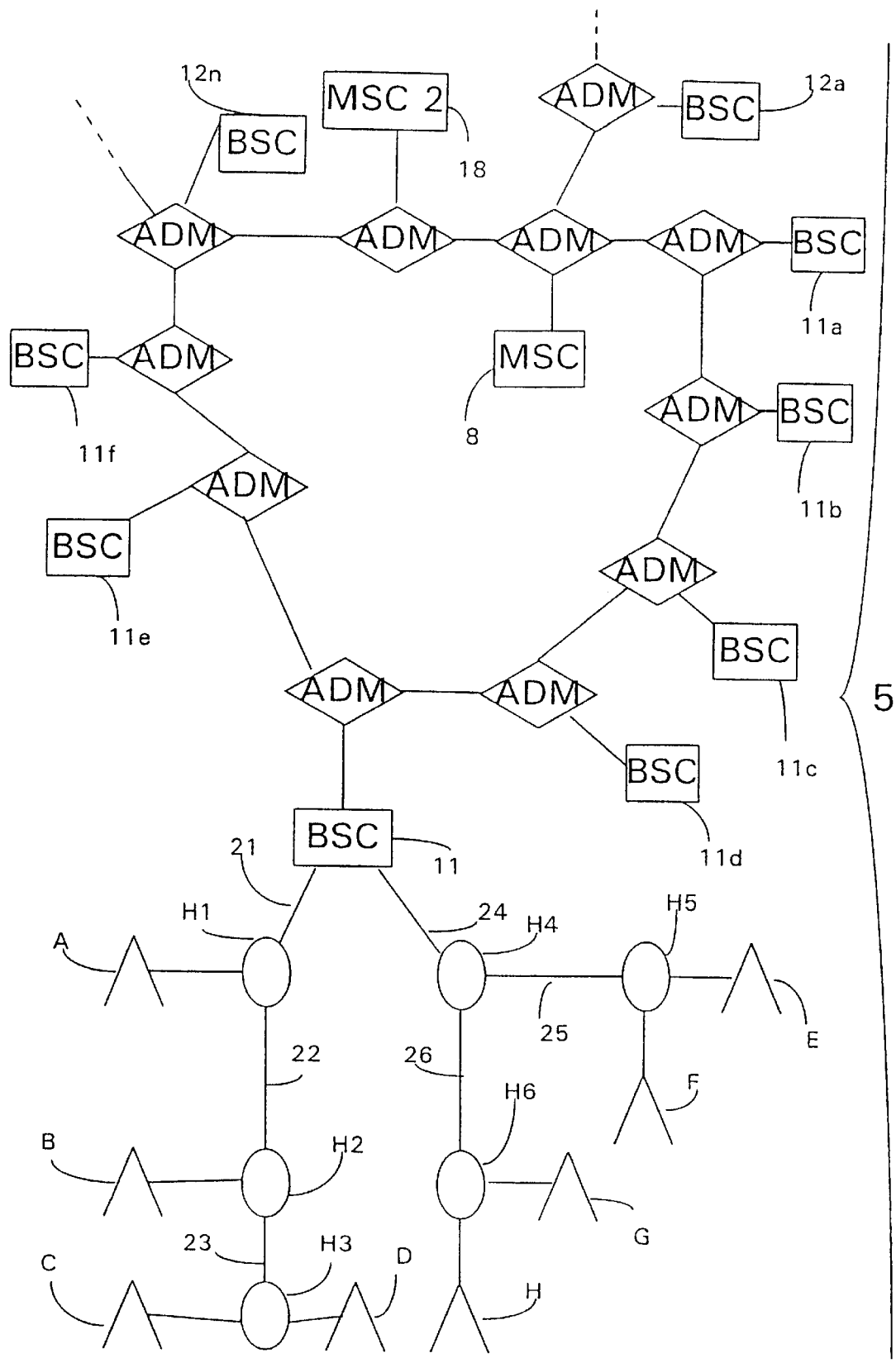
FIG. 4 shows a more complex transmission network.

FIG. 4 shows the functional relationship of the various elements of a more complex network, also in accordance with the invention, illustrating a number of individual features of the branched network. It should be recognised that the physical links illustrated will in practice be embodied by a system of links having a built-in redundancy, in order to make the system more robust. A group of base site controllers 11a, 11b . . . 11g etc are operated under the control of a mobile switching centre (MSC) 8. The mobile switching centre 8 and each of the base site controllers 11a etc may communicate with the mobile switching centre, 8 by means of a communications network such as a synchronous digital highway (SDH) loop. Capacities required by the individual base site controllers justify the use of a synchronous digital hierarchy loop arrangement at this level in the network, but not in the links to individual base stations. As a precaution against the failure of the mobile switching centre 8, a second mobile switching centre 18 is also connectable to the base site controllers 11 to 11g, as well to its own dedicated base site controllers 12a, etc to 12n. Similarly, should the second mobile switching centre 18 fail, then the base site controllers normally served by that mobile switching centre can be controlled by the mobile switching centre 8. Each base site controller and mobile switching centre is connected into the synchronous digital hierarchy network by means of an add-drop multiplexer ADM, which extracts the traffic intended for the individual base site controller from the network and adds, to the SDH loop, traffic originating from that BSC. It should be noted that the add-drop multiplexers are controlled in order to extract the relevant signals from the multiplex carried on the main loop. Moreover, if a synchronous digital hierarchy is in use, the minimum amount which can be extracted from the synchronous digital hierarchy system is determined by the capacity of an individual module of the hierarchy, known as "STM1". The minimum capacity of a complete SDH system, on which such STM1 modules are carried, is of an appropriate size to serve the area covered by an individual mobile switching centre.

Each individual base controller (BSC) serves a number of base transceiver sites. This is illustrated specifically only for one base site controller 11, but it will be appreciated that all the other base site controllers 11a–11g serve a similar arrangement of base transceiver sites. Each base site controller may serve one or more main hubs. As shown in FIG. 4, the base site controller 11 serves two hubs H1 and H4. The branched structure of the hierarchy may take may forms, of which two are illustrated in FIG. 4. In the first example, serving base transceiver sites A, B, C and D, base transceiver sites C and D are connected to a hub H3 which has a dedicated respective trunk link 23 which is connected to a second hub H2. Hub H2 also serves another base transceiver site B directly, and has its own respective trunk link 22 connecting it to the rest of the network through a third hub H1, which itself also serves base transceiver A directly. Hub H1 has a respective trunk link 21 connecting it to the base site controller 11 and thus to the rest of the network. In the arrangement shown serving base transceiver sites E, F, G and H, base transceiver sites E and F are served by a hub H5, which has a dedicated trunk link 25 connecting to the rest of the network by means of a further hub H4. Similarly base transceivers G and H are connected to a hub H6, which is connected by a respective trunk link 26 to the hub H4. Hub H4 is connected by means of a respective trunk link 24 to the base site controller 11.

Because each trunk link 21, 22, 23, 24, 25 and 26 serves only a small number of base transceiver sites, and particularly in the case of links 24, 25 and 26 the number of base transceiver sites falls off in a hierarchical form, these branched configurations are suitable for use with both plesiochronous digital hierarchy (PDH) and synchronous digital hierarchy systems. The synchronous digital hierarchy protocol allows the carriage of many different bit streams, and any part of the multiplex, down to the basic 2 Mbit/s base unit, can be extracted at any add-drop multiplexer ADM along the route of the carrier. The plesiochronous digital hierarchy (PDH) system is not fully synchronous, and individual elements of the multiplex may be displaced from sychronicity with others by a small amount. This means that in order to add or extract any part of the multiplex at an add-drop multiplexer the various levels of multiplexing have to be gone through one at a time, in contrast to the situation with the SDH where any part can be taken out directly, without going through the intermediate multiplex levels. The network architecture described above with reference to FIG. 4 is very suitable to use with both the SDH and PDH systems. In particular, because of the branched arrangement of the network, the stepping down or up between various multiplex levels is not a significant problem, because the various steps can be made to coincide with the various branchings of the network. In contrast, in the prior art arrangement described above in relation to International Patent Specification WO94/00959, a PDH architecture would be inappropriate because at each point on the ring, which serves a base transceiver site, it would be necessary in a PDH system to demultiplex, one layer at a time, down to the basic level at which each base transceiver site's own individual multiplex element could be extracted, and then reconstitute the multiplexing, stage by stage, for onward transmission to the next element around the loop. The architecture of the present invention is particularly appropriate to PDH, but SDH could be used with little impairment.

Figure 5:
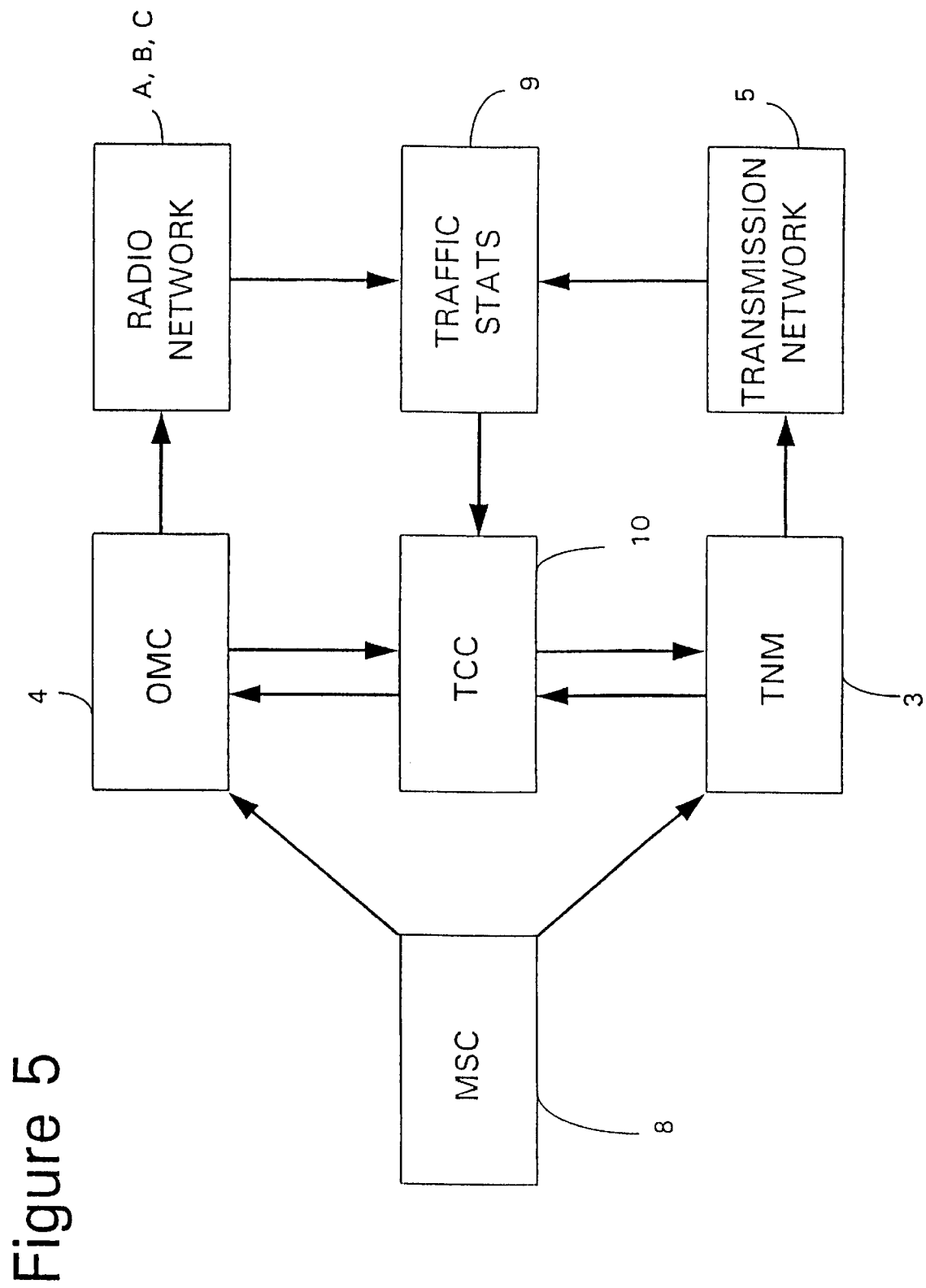
FIG. 5 shows an architecture for the monitoring and control system of the cellular radio network.

FIG. 5 shows the basic arrangement of various control systems which together cooperate to maximise the use of the radio resource and transmission network resources available. The transmission resource 3 and operation and maintenance centre for the radio resource (4) respectively control the transmission network (5) and radio network (i.e. base transceiver A, B and C). These both supply inputs to a statistical monitoring system 9, which also has data on regular daily, weekly etc demand for the system. Input from the traffic statistics system, the transmission network manager 3, and the operation and maintenance centre (4) are applied to a transmission capacity controller 10, which in turn control the transmission network manager 3 and operation and maintenance centre 4. The transmission capacity controller 10, which will be associated with the mobile switching centre 8, monitors both the radio and fixed parts of the system to detect faults and usage of the system, and in turn controls them, for example in order to establish links between individual elements of the fixed system, making use of the flexibility of the fixed network and to switch radio transceivers on and off in the radio network in accordance with the capacity of the part of the transmission network feeding their respective base stations.

By separating this function from the routine operation of the mobile switching centre, (which operates to provide radio capacity, and also fixed network capacity, on demand), the system can better cope with individual demand cases. In particular, at times when there is spare capacity in the system, the transmission capacity controller arranges that this spare capacity is spread evenly around the system, so that extra capacity can be switched in by the OMC 4 and transmission network manager 3 to any part of the radio network, using spare capacity allocated to it, without requiring intervention from the transmission capacity controller. This allows individual call set ups and handovers to be handled promptly, while the transmission capacity controller can monitor and deal with incipient large scale capacity problems on a longer time scale.

Figure 6:
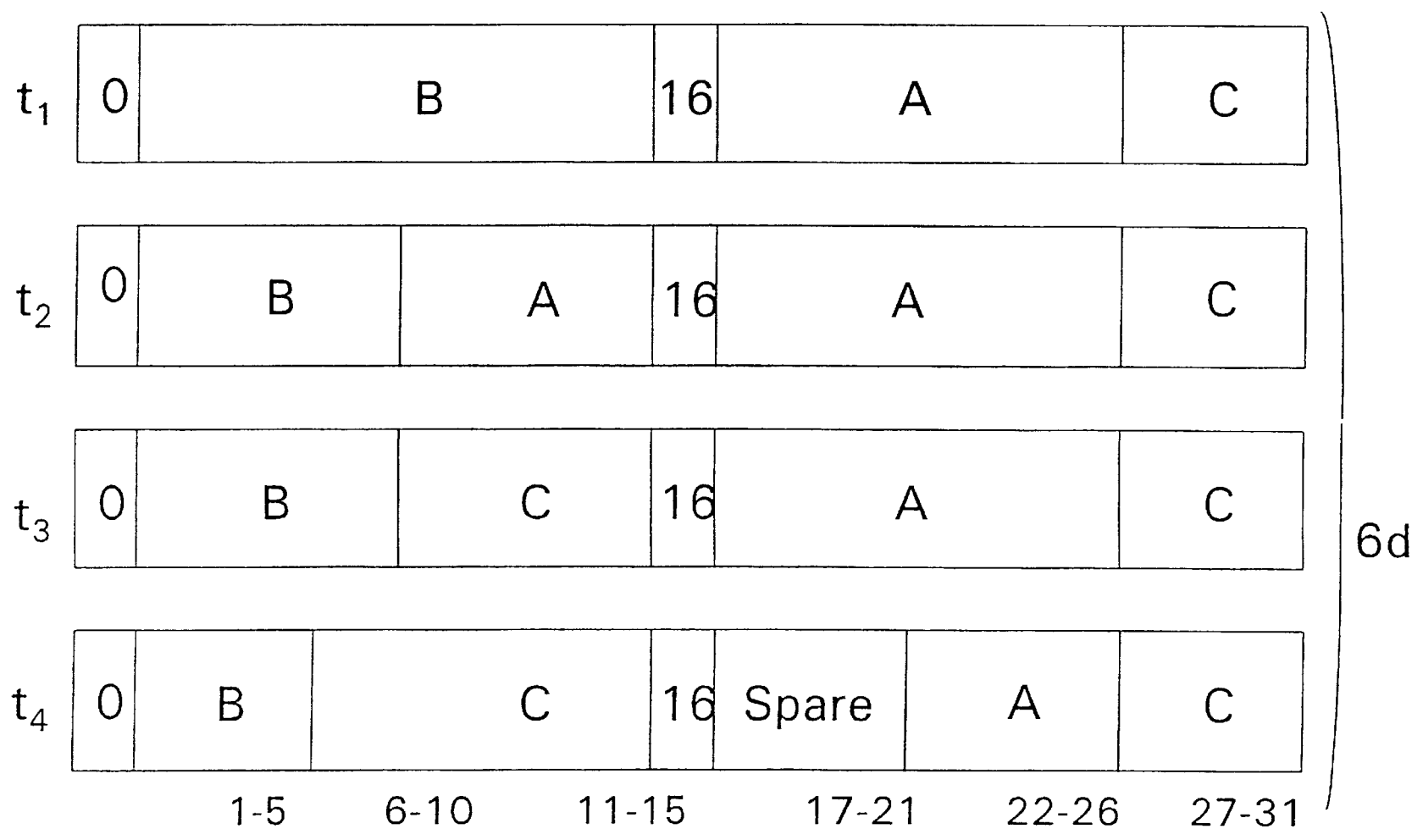

FIG. 6 shows the timeslot allocations on one of the three channels 6d, 6e, 6f for the four periods t1, t2, t3, t4 for the three base transceiver sites A, B and C of FIG. 3. Each channel has 32 time slots (numbered 0 to 31) including a synchronisation time slot 0 and a signalling time slot 16, thus leaving a total of 30 time slots on each of the three channels 6d, 6e, 6f (i.e. 90 time slots in total) for call traffic. In the described embodiment the timeslot allocations are divided equally between the channels 6d, 6e, 6f.

FIG. 1 shows that the total demand for the three base transceiver sites A, B, C never exceeds 90 channels, although the total of the individual maxima is 3×45=135. In the prior art system shown in FIG. 2 the total capacity required over the trunk link 2 to support these three base transceiver sites is 135 channels, i.e. the total of the respective maximum capacities. However, only 90 of these channels will be in use at any given time, therefore the trunk link 2 has an over-capacity of 50%.

The operation of the embodiment of FIG. 3 will now be described, with reference to FIG. 6. FIG. 6 shows the timeslot allocations for channel 6d. Similar allocations are made for the other two channels 6e, 6f. In a morning period t1, e.g. 7 a.m. to noon, base transceiver site B is allocated 45 time slots (i.e. fifteen on each channel), base transceiver site A is allocated 30 time slots (ten on each channel), and base transceiver site C is allocated 15 time slots (five on each channel), In this example, in channel 6d base transceiver site B is allocated timeslots 1 to 15, base transceiver site A is allocated timeslots 17 to 26, and base transceiver site C is allocated timesiots 27 to 31. At a changeover time T1, in this example noon, fifteen time slots (five from each channel) are transferred from the allocation of base transceiver site B to that of base transceiver site A (in this example timeslots 11 to 15 from channel 6d, etc.). This allows base transceiver site A to use all its 45 radio channels in the afternoon period t2, whilst leaving base transceiver site B with 30 time slots. base transceiver site C still has 15 time slots allocated to it. The number of time slots required in total is therefore 90 in both time periods t1 and t2.

At a second changeover time T2, for example 6 p.m., fifteen time slots (11 to 15 from channel 6*d*, etc.) are transferred from base transceiver site A to base transceiver site C, so that each base transceiver site now has 30 time slots allocated to it.

At a third changeover time T3 (for example midnight) fifteen time slots (6 to 10 from channel 6*d*, etc.) are reallocated from base transceiver site B to base transceiver site C, thereby allowing base transceiver site C to use all its 45 radio channels during the overnight period t4, whilst leaving base transceiver site B with 15 time slots. base transceiver site A also requires only fifteen time slots for the overnight period t4, so fifteen time slots (17 to 21 from channel 6*d*, etc.) become spare. These spare time slots can be allocated to other base transceiver sites (not shown) or held in reserve for contingencies, such as the failure of one of the channels 6*d*, 6*e*, 6*f* in the trunk link 6.

Finally, at time T0, thirty of the time slots allocated to base transceiver site C are reallocated to base transceiver site B, and the fifteen spare timeslots are allocated to base transceiver site C, ready for the cycle to repeat again.

The channels 6*d*, 6*e*, 6*f* making up the trunk link 6 may be routed separately, over different physical routes, in order to safeguard against simultaneous failure of the entire link 6. The timeslots allocated to each base transceiver site are distributed amongst the channels 6*d*, 6*e*, 6*f* such that each base transceiver site has some timeslots on each channel. This ensures that should one of the channels 6*d*, 6*e*, 6*f* fail, some capacity is maintained for each base transceiver site A, B, C.

In the morning period t1, base transceiver site A has only fifteen timeslots available on the link 5 to support its forty-five radio channels. The remaining thirty radio channels are "busied out", i.e. the base site controller is instructed not to allow the base transceiver site A to operate on those remaining radio channels, thereby limiting the number of mobile units which can be put into communication with the network through that base transceiver site A.

This illustrative example includes a number of spare timeslots in the overnight period t4. Each channel has thirty traffic timeslots, and thus timeslots are only available in multiples of thirty. In a typical system there would be more than three base transceiver sites, and it will be easier to match the timeslot capacity to the demand. However, the availability of some spare timeslots can be useful to ensure robustness of the system should one of the channels 6*d*, 6*e*, 6*f* fail, since some of the calls which would otherwise be lost can be transferred to the spare timeslots on the remaining line.

It is possible that at certain times of day a base transceiver site has no demand at all, or what demand there is can be covered by neighbouring base transceiver sites whose coverage areas overlap with it. In such circumstances the whole base transceiver site could be "busied out", or a single channel maintained for emergency use. Similarly, if one of the base transceiver sites is shut down completely, e.g. because of a fault or for maintenance, the channels in the transmission network dedicated to that base transceiver site can all be reallocated to the other base transceiver sites.

This system adds a small amount of additional blocking to that already in existence in other parts of the network, most notably the air interface between the base transceiver sites A, B and C and the mobile units. Blocking is calculated as a percentage of call attempts in which the non-availability of a channel causes the call to fail. The additional blocking introduced by having fewer trunk links available than there are base transceiver site channels (in other words, in which there is a radio channel available but no trunk channel) has been calculated theoretically as follows:

| Blocking at trunk level | Number of available channels |
| --- | --- |
| 0 | 135 |
| 0.05% | 100 |
| 0.1% | 98 |
| 0.5% | 92 |
| 1% | 89 |

It will be seen from the above table that in this example less than 1% of traffic is lost for a saving of one third of the capacity required in the trunk link 5 (90 timeslots for 135 channels). With 100 trunk channels available to serve 135 base transceiver site channels, i.e. a saving of 25%, only 0.05% (i.e. 1 in 2000) of call traffic would be lost.

Although the changeover is shown as happening at fixed times T0, T1, T2, it is desirable to arrange that the channel is reallocated from the first base transceiver site A to the second base transceiver site B when the channel is not already in use by the first base transceiver site A. For this reason, for any channel which is actually in use at the changeover time, that channel remains allocated to the first base transceiver site until the call is terminated or handed over, and the channel then reallocated to the second base transceiver site.

In a variant of this system, the levels of demand on the various base transceiver sites A, B and C are monitored, and channels in the transmission network are allocated to the base transceiver sites as required. In this arrangement, channels which are not currently in use are not allocated to any individual base transceiver site, but form a "floating reserve", available for use by any of the base transceiver sites A, B, C.

If a mobile unit requires a handover from one base transceiver site A to another base transceiver site B served from the same branch point, this would not be possible if all the channels on the branch point to base site controller link 5 are in use, because although there are radio channels available at the base transceiver site B to which handover is to take place, those channels are "busied out" because there are no channels available for them in the fixed link. A channel will, of course, become available as soon as the call is dropped as a result of the failure of the first base transceiver site A to hand over before signal quality deteriorates to a level where the call has to be dropped. However this channel would become available to any mobile unit attempting to make a call, and the mobile unit from which handover was unsuccessfully attempted would have to start the call initiation process again, and would have no more chance of obtaining that channel than any other mobile unit—in fact rather less, since another mobile unit which has already started a call attempt is likely to seize the channel first. It is desirable to maintain existing calls, in preference to failing them in order to allow further call attempts to succeed, (provided that all the calls are of the same priority). In order to do this the base site controller BSC, recognising that a handover is required between two base transceiver sites A, B served from one branch point, transfers the channel (e.g. 6a) in the branch point-to-BSC link 6 allocated to the call that the mobile unit is engaged on from the first radio base station A to the second base transceiver site B at the instant of handover.

The preferred embodiment has been described in relation to the architecture and terminology of the GSM standard for cellular radio systems. However it is possible to use a similar system for other cellular radio systems, and also for private mobile radio networks. In contrast to the embodiment illustrated with reference to FIG. 3, in a cellular radio system in which the radio base station control functions are co-located with the radio transceivers under their control, the branched network is located between the base stations A, B, C and the mobile switching centre MSC, there being no separate base site controller. It will be apparent that the described embodiment can be readily adapted to such a configuration.

Private mobile radio networks have one or more radio base stations, for communication with mobile units. In typical applications, a private mobile radio network such as used by field forces for utilities such as gas, electricity, telecommunications, etc. or by transport undertakings such as taxi, railway and bus operators etc., each have a radio base station (in some cases several) which communicates only with the mobile units belonging to that network. Each private mobile network has a radio base station positioned according to its own requirements, and it is likely that some of the capacity in the fixed parts of these networks is carried over common links, particularly since the facility is likely to be provided by a specialist telecommunications company. The private mobile radio network systems must each have sufficient capacity to deal with their own peak demand times, but clearly different operators have different demand patterns, and by sharing capacity in the fixed part of the network the various private mobile radio operators may reduce the capacity requirements on the fixed network with a minimal number of failed calls. If the allocation of channels is arranged on a demand basis, rather than time of day basis, then with suitable call prioritisation, even emergency services, whose capacity requirements are normally low but have unpredictable very large surges in demand, can share the total capacity with other operators with more predictable but less variable demand patterns.

What is claimed is:

1. A mobile radio system for serving a plurality of mobile radio stations, the system comprising: a plurality of radio base stations for communicating with the mobile radio stations, and each having an allocated number of radio channels;

one or more trunk communications links;

each trunk communications link serving a respective intermediate switch serving a plurality of radio base stations;

each radio base station being connected to its serving intermediate switch by a communications link having at least the same number of channels as the radio base station has allocated radio channels;

each trunk communications link having fewer channels than the total number of radio channels of the plurality of radio base stations served by its respective intermediate switch; and radio resource control means for controlling the radio base stations so that the total number of channels in use by each trunk communications link is greater than or equal to the number of radio channels in use by the base stations it serves.

2. A mobile radio system according to claim 1, wherein one or more first intermediate switches connected by their respective trunk communications link to a further one of the intermediate switches, the further intermediate switch thereby serving the base stations also served by the one or more first intermediate switches.

3. A mobile radio system according to claim 1, wherein the communications links are arranged to operate as a plesiochronous digital hierarchy.

4. A mobile radio system according to claim 1, in which each radio base station has associated control means to selectively enable and disable one or more of its available radio channels and associated communications link channels such that the total number of enabled radio channels does not exceed the number of channels in the trunk link and the intermediate switch has means to allocate the channels in the trunk link to calls using those channels in the communications link associated with the currently enabled radio channels, and the intermediate switch has means to allocate the channels in the trunk link to calls using those channels in the communications link associated with the currently enabled radio channels.

5. A mobile radio system according to claim 1 wherein the trunk communications links form part of a transmission network under the control of a transmission network management means, the system further comprising a traffic-demand data-input means, a transmission capacity controller for co-ordinating the operation of the radio resource control means and transmission network management means in response to inputs from the traffic-demand data input means.

6. A mobile radio system according to claim 1, further comprising means associated with the control means responsive to a request to establish radio communication with a mobile unit arranged such that a channel in the trunk link is allocated to the respective radio base station in response to such a request.

7. A mobile radio system according to claim 6, further comprising means responsive to a request for a handover of a mobile unit and associated with the control means, arranged such that connection of the communication channel of the trunk link on which the mobile unit is currently operating is transferred from the communications link associated with a first radio base station, from which it is to be handed over, to the communications link associated with a second radio base station, to which it is to be handed over.

8. A mobile radio system according to claim 1 wherein the control means operates according to a predetermined schedule.

9. A mobile radio system according to claim 8 wherein the control means is arranged such that, in the event that a channel is in use by a call in progress at the scheduled time for it to be disabled, the disabling function and any corresponding enabling function for that channel are delayed until the channel usage ceases.

10. A method of operating a mobile radio system comprising a plurality of radio base stations each capable of transmitting to, and receiving radio signals from, mobile radio stations on a number of radio channels, each radio base station being connected to an associated intermediate switch by an associated communications link having at least the same number of channels as the radio base station has allocated radio channels; and one or more trunk communications links, each trunk communications link serving a respective intermediate switch and having fewer channels than the total number of radio channels of the plurality of base stations served by its respective intermediate switch, the method comprising the steps of controlling one or more of the radio base stations connected to an intermediate switch, and their associated communications links, so that the total number of radio channels in use by the radio base stations served by an intermediate switch is less than or equal to the number of channels used by the trunk communications link serving the intermediate switch.

11. A method according to claim 10, wherein the communications links are operated as a plesiochronous digital hierarchy.

12. A method according to claim 10 comprising the steps of selectively enabling and disabling one or more of the radio channels available to the radio base stations, such that the total number of enabled radio channels does not exceed the number of channels in the trunk link, and allocating the channels in the trunk link to calls using those channels in the communications link associated with the currently enabled radio channels.

13. A method according to claim 10, wherein a communications channel in the trunk link is allocated to a radio base station in response to a request to establish radio communication between that radio base station and a mobile radio unit.

14. A method according to claim 13, wherein, in response to a request for a handover of a mobile unit, connection of the channel on the trunk link on which the mobile unit is currently operating is transferred from a communications link associated with a first radio base station, from which it is to be handed over, to a communications link associated with a second radio base station, to which it is to be handed over.

15. A method according to claim 10, wherein the controlling of channels operates according to a predetermined schedule.

16. A method according to claim 15 wherein, in the event that a channel is in use by a call in progress at the scheduled time for it to be disabled, the disabling function and any corresponding enabling function for that channel are delayed until the channel usage ceases.

17. A method according to claim 10, wherein the trunk communications links form part of a transmission network under the control of a transmission network management means, wherein traffic demand data is used to co-ordinate the operation of the radio base stations and transmission network management means.

18. A method according to claim 17, wherein traffic demand is monitored in real-time in order to supply the traffic demand data.

19. A method according to claim 17, wherein any spare traffic capacity is distributed in the radio and transmission networks.

* * * * *